UNITED STATES PATENT OFFICE 2,552,178

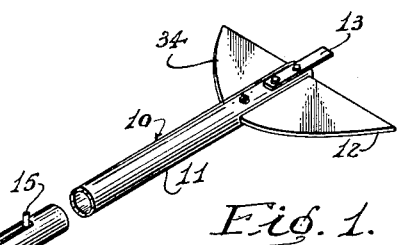
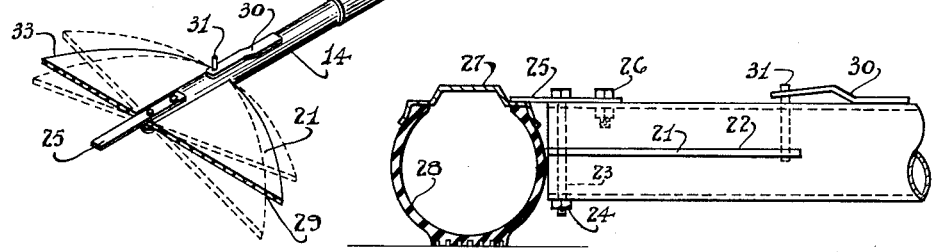
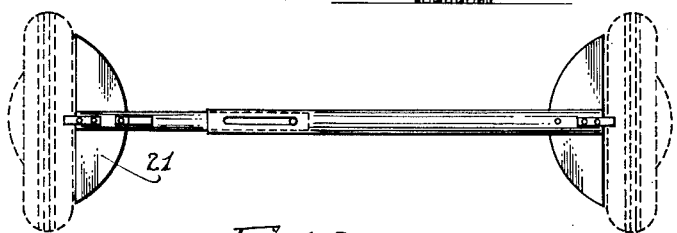
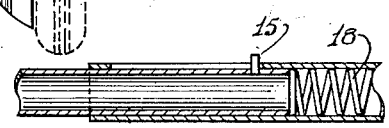
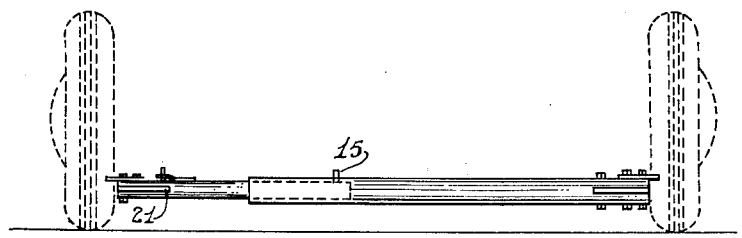
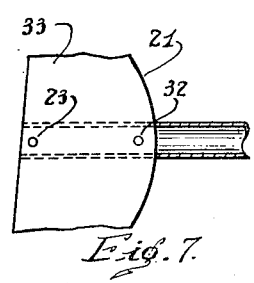
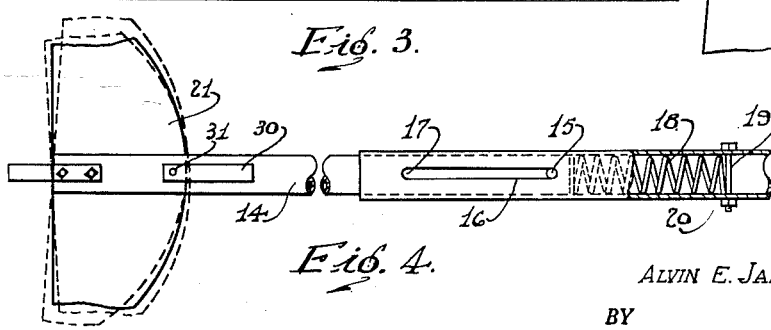
INVENTOR.
ALVIN E. JAMES

FRONT END ALIGNING DEVICE FOR AUTOMOBILES

Alvin Elmo James, Waycross, Ga.

Application March 30, 1949, Serial No. 84,421

3 Claims. (Cl. 33—203.2)

This invention involves alignment devices for automobiles. More specifically the object of this device is to provide an easily constructed means whereby one man may correct the toe-in of the front wheels of an automobile.

Another object is to provide an audible signal whenever the correct toe-in has been accomplished.

A further object of this invention is to provide a front end alignment device which may be universally adapted to all wheel bases now in commercial use.

A still further object is to simultaneously provide coordinated readings for both front and rear portions of the tire.

Other objects of the invention will become apparent after specific reference to the specification and drawing is made.

In the drawings:

Figure 1 is a perspective view of the invention.

Figure 2 is a plan view of the alignment device in place on the front wheels of an automobile.

Figure 3 is a front view of the device similar to Fig. 2.

Figure 4 is an enlarged view similar to Fig. 2 partially in section showing the spring-biased member and the pivotal plate of the invention.

Figure 5 is an enlarged view showing one-half of the device in place on an automobile wheel rim and incorporating the audible signal after it has been actuated.

Figure 6 is an enlarged illustration of the spring-biased telescoping members.

Figure 7 is an enlarged view of the pivotal plate.

Similar reference characters in the several figures indicate similar parts.

In the automotive industry alignment devices previously used have proved either too cumbersome or fragile to be efficiently employed by the average repair man. Heretofore the gauges employed have been of such construction that the operator is required to work in bright light in order to read the gauges. In the instant device the operator may work in semi-darkness as is often the condition encountered underneath automobiles in repair shops and at the same time obtain excellent results. The mechanics need not be highly skilled to use the instant device as it requires little ability to operate. With this device the operator may instantaneously obtain a correct alignment which alignment takes into consideration both the front and rearward portions of the tire, whereas some types of alignment devices require two readings to accomplish this.

The alignment device, as generally shown at 10, includes a hollow tube 11, a fixed plate 12 and on the upper portion of the tube a lug 13. Telescoping in the hollow tube 10 is a second hollow tube 14 which tube is prevented from rotating by the pin 15 sliding in the groove 16 of the hollow tube 10. The hollow tube 14 is spring-biased so that the pin 15, whenever the apparatus is not in use, is against the end 17 of the slot 16. This action is brought about by the spring 18 acting at one end against the tube 14 and being restrained at the other end by a bolt 19 retained by the nut 20 across the hollow tube 10. At the end of the tube 14 the plate 21 is pivotally mounted in a slot 22 about bolt 23 which is retained in place by nut 24. Also at this end of the hollow tube 14 is a lug 25, similar to the lug 13 of the tube 10, the lug 25 being retained in place by bolts 23 and 26. The object of lug 25 is to support one end of the device while in use by resting on the wheel rim 27 enclosing the tire 28, as shown in Fig. 5, the opposite end of the device being similarly supported by lug 13. The tire abutting portions of plates 12 and 21 are knurled as shown at 29 in Fig. 1. On top of the tube 14 is a leaf-spring lever 30 and an integral spring actuated pin 31. When obtaining correct alignment of the wheels the spring pin 31 rides on the plate 21 until the correct alignment is achieved at which point it is forced with an audible snap through the hole 32 on the plate 21.

When initially constructed the pivotal plate 21 is fashioned with the edge 33 displaced $\frac{1}{16}$" from parallel with the edge 34 of fixed plate 12. In this position the hole 32 of the pivotal plate 21 is bored directly in line with the axis of spring-biased pin 31. This construction positively assures the operator that whenever the pin 31 is seated in the hole 32 correct alignment of the front wheels has occurred.

The operation of the alignment device is as follows: The tube 14 is telescoped inside the tube 10 against the action of the spring 18 and placed in position, as shown in Figs. 2 and 3, with the lugs 13 and 25 respectively resting on the rims and the knurled plates 12 and 29 resting against the tires. As is readily noted the spring action forces the two hollow rods outwardly away from each other and provides a snug fit against each tire respectively. The spring, therefore, adapts the device so that it may be used to span the distance between the wheels for all size automobiles.

With the alignment device seated in place, the operator now withdraws pin 31 from its seat 32 in the plate 21 and pivots the plate to produce a flush fit of this plate against the tire. At the same time the opposite plate 12 is prevented from pivoting away from its flush abutment with its tire. Next the operator directs his full attention to the tie rod adjustment and when he hears the audible click of the spring-biased pin 31 seating in its hole he is positive correct alignment has been accomplished.

It is noted that in certain types of cars, mainly the 1949 Ford, the factory requirement is for $\frac{1}{16}$ toe out. In such a case this invention may also be employed in that it merely necessitates using the device upside down, that is, with the lugs resting on the rims, but with the plates above the lugs rather than beneath as shown in the drawing.

While I have shown and described a preferred form of my invention, it will be understood that variations in details of form may be made without departure from the invention as defined in the appended claims.

I claim:

1. A wheel alignment device for automobiles comprising a pair of spring-biased telescoping members, a fixed plate mounted at the end of one of said telescoping members, a pivotal plate mounted on the other of said telescoping members, said pivotal plate having an aperture in a predetermined position, a leaf spring, and a pin mounted on the telescoping member in relation to the pivotal plate, said pin member being adapted to seat under the influence of said leaf spring in said predetermined aperture in the pivotal plate upon achievement of correct alignment.

2. In a wheel alignment device for automobiles, a pair of spring-biased telescoping members, the larger of said telescoping members including a slot, the smaller of said telescoping members being provided with a pin riding in said slot of said larger telescoping member, a fixed plate, an oppositely disposed pivotal plate, said pivotal plate having an aperture in a predetermined position, a pair of outwardly projecting members mounted on each telescoping member above said fixed plate and pivotal plate respectively, and an audible signal comprising a spring-biased pin mounted in one of said telescopic members and adapted to seat in the cooperating aperture of said pivotal plate when correct alignment is brought about.

3. In a wheel alignment device for automobiles, a pair of spring-biased telescoping members, the larger of said telescoping members including a slot, the smaller of said telescoping members provided with a pin, a fixed plate and an oppositely disposed pivotal plate engaging the inner surfaces of the tires of the automobile, said pivotal plate having an aperture in a predetermined position, said plates being knurled at their tire engaging edge, a pair of projecting members mounted on each telescoping member above said fixed plate and pivotal plate respectively, and an audible signal comprising a spring-biased pin mounted in one of said telescopic members and adapted to seat in the cooperating aperture of said pivotal plate when proper alignment is obtained.

ALVIN ELMO JAMES.

REFERENCES CITED

The following references are of record in the file of this patent:

UNITED STATES PATENTS

| Number | Name | Date |
|---|---|---|
| 549,444 | Dailey | Nov. 5, 1895 |
| 1,324,388 | Duby | Dec. 9, 1919 |
| 1,516,549 | Sandbo | Nov. 25, 1924 |
| 2,000,866 | Smith | May 7, 1935 |

FOREIGN PATENTS

| Number | Country | Date |
|---|---|---|
| 14,576 | Great Britain | A. D. 1913 |